(12) United States Patent
Verbowski

(10) Patent No.: US 8,752,812 B2
(45) Date of Patent: Jun. 17, 2014

(54) CONVERSION ASSEMBLIES FOR SHOCKS AND STRUTS

(76) Inventor: Larry J. Verbowski, Bay City, MI (US)

( * ) Notice: Subject to any disclaimer, the term of this patent is extended or adjusted under 35 U.S.C. 154(b) by 195 days.

(21) Appl. No.: 13/479,371

(22) Filed: May 24, 2012

(65) Prior Publication Data

US 2013/0313768 A1 Nov. 28, 2013

(51) Int. Cl.
*B60G 21/04* (2006.01)
(52) U.S. Cl.
USPC .... 267/220; 267/122; 267/64.27; 188/321.11
(58) Field of Classification Search
USPC .......... 188/321.11, 322.22; 267/64.19, 64.23, 267/64.27, 220, 221, 122
See application file for complete search history.

(56) References Cited

U.S. PATENT DOCUMENTS

| | | | | |
|---|---|---|---|---|
| 3,347,541 A * | 10/1967 | Buccino | | 267/220 |
| 5,232,209 A * | 8/1993 | de Fontenay | | 267/220 |
| 6,042,092 A * | 3/2000 | Shibata | | 267/122 |
| 7,032,896 B2 * | 4/2006 | Collis et al. | | 267/122 |
| 7,281,705 B2 * | 10/2007 | Huprikar | | 267/220 |

* cited by examiner

*Primary Examiner* — Melanie Torres Williams

(57) ABSTRACT

Conversion assemblies and conversion assemblies combined with automotive shock absorbing assemblies for automotive use, such as shocks and struts. There is disclosed herein, in combination, a conversion assembly and an automotive shock absorbing assembly for automotive use, said automotive shock absorbing assembly being selected from the group consisting of shocks and, struts.

11 Claims, 12 Drawing Sheets

CONVERSION ASSEMBLIES FOR SHOCKS AND STRUTS

BACKGROUND OF THE INVENTION

Shocks and struts are very familiar to those in the automotive repair or installation business. Most known are the smooth outside body shocks without any provision for coils or the like. They are non-re-buildable and are non-adjusting for dampening purposes. There is ordinarily no piston rod protection such as a shield for dust and splashes.

For racing purposes, they are usually manufactured from lightweight aluminum and are fully machined for the addition of coils but have no protective bellows or adjustable coil positions. They are re-buildable.

For load supporting management, the devices have to be designed during manufacturing such that they have provisions for coils. However, they are non-adjustable, have fixed heights, require complete replacement of the shock, are non-re-buildable and have no piston rod protection. The lightweight materials lack strength and the metallic spherical rod ends transmit noise to the body of the vehicle. They are exposed such that they have corrosion problems from the elements and have very limited life spans.

The devices of the instant invention have both front and rear end applications. The invention herein provides strong adjuster shock tubes in that they can be made out of steel as opposed to the aluminum materials used in normal shock manufacturing. The support using the inventive devices is at the top of the shock body as opposed to the load support provided by prior art devices wherein the load is supported at or near the bottom of the shock. Thus, this allows improved clearance for the drive line, steering, tire, and wheels.

THE INVENTION

Thus, what is disclosed and claimed herein are conversion assemblies. The conversion assemblies are combined with automotive shock absorbing assemblies for automotive use, such as shocks and struts. Thus, there is in combination, a conversion assembly and an automotive shock absorbing assembly for automotive use, said automotive shock absorbing assembly being selected from the group consisting of shocks and, struts.

The conversion assemblies have an external housing having a distal end, and a near end, the automotive shock absorbing assembly distal end having a piston rod protruding from it and said the automotive shock absorbing assembly distal end has mounted on it, a means for attaching the automotive shock absorbing assembly to an automobile frame. The automotive shock absorbing assembly distal end has mounted thereon, a means for attaching the automotive shock absorbing assembly to an automobile frame.

The conversion assembly has an external spring adjuster tube, the external spring adjuster tube having a near end and a distal end. There is a first piston rod opening in the near end creating a near end housing plate, the near end housing plate having an inside surface, the inside surface being beveled. The piston rod near end has threads on it.

The distal end of the conversion assembly is open to accommodate an automotive shock absorbing assembly. The distal end of the external spring adjuster tube has on an outside surface, a threaded profile. There is mounted on the external spring adjuster tube, a coil spring height adjustment ring. There is a piston rod protective bellows surrounding the piston rod.

There is a coil spring retainer cap and contained within the external spring adjuster tube, there is a coil spring. There is a shock stem adapter for retaining the coil spring retainer cap, the shock stem adapter being a hollow tube. The hollow tube has an internal threaded surface and an external surface to accommodate a wrench.

There is an assembly for locking the external spring adjuster tube on the piston rod the assembly comprising a lower load support washer surmounting the shock stem adapter and coil spring retainer cap; a lower load support stem grommet surmounting the washer; an upper load support stem grommet surmounting the lower load support stem grommet; an upper load support retainer washer surmounting said upper load support stem grommet, and, a locking nut surmounting said upper load support retainer washer, the nut being threaded on the threaded surface of the piston rod. There is a fastening means for the piston rod bellows distal end on the piston rod bellows retainer. The top end of the piston rod bellows is retained by the shock stem adapter.

In a second embodiment, there is a conversion assembly that is modified such that it can be readily used with eye type top mount shocks. Such shocks are manufactured with an eyelet being welded on the top of the piston rod such that the components of the first embodiments would not fit over the eyelet in order to assemble the conversion assembly.

DETAILED DESCRIPTION OF THE INVENTION

The invention described and claimed herein deals with a conversation assembly for shocks and struts in automotive uses, along with a description and claims directed to a combination of such conversation assemblies with automotive shock absorbing assemblies.

Figure 1:
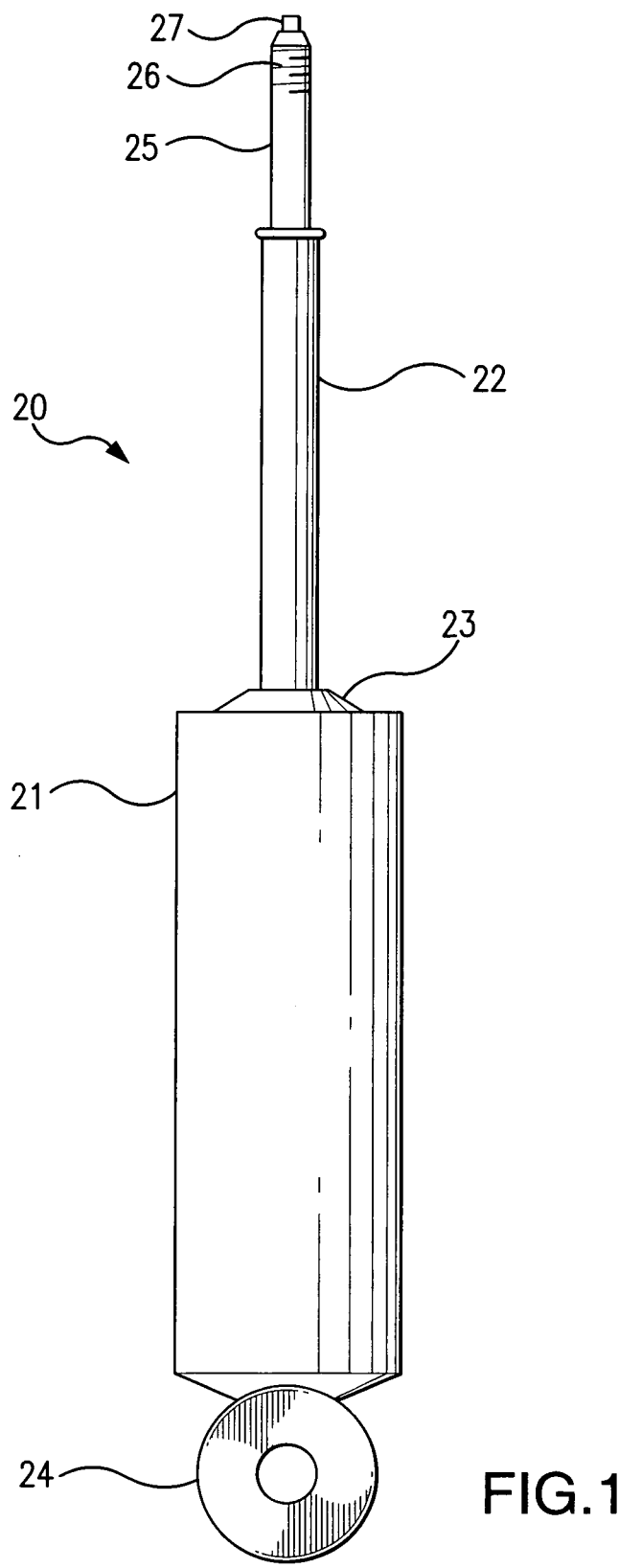
FIG. 1 is a full side view of an illustration of a smooth body shock that is a prior art shock.

FIG. 1 is a full side view of an illustration of a smooth body shock 20 that is a prior art shock. Shown in FIG. 1 is the smooth housing 21, the piston rod 22, a seal 23 for the piston rod 22, the chassis attachment means 24 (a ring) for attachment of the shock 20 to the chassis or frame of an automobile, the top end 25 of the piston rod 22 showing the terminal end threads 26, by which the upper end of the piston rod 22 is attached to an automobile, along with a surfaced segment 27 for using a wrench.

This device has the disadvantage that the threads for adjustment are machined directly on the body of the shock and therefore, the walls of the shock have to be thicker.

Figure 2:
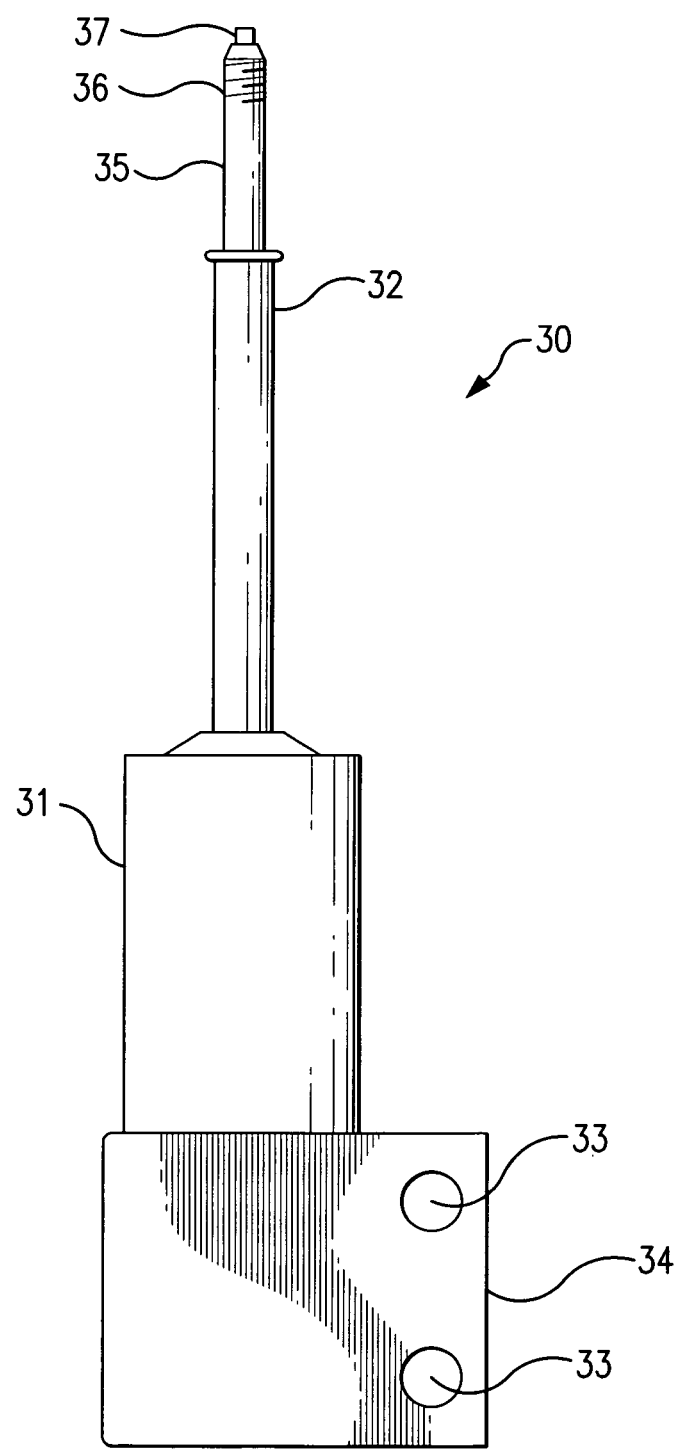
FIG. 2 is a full side view of an illustration of a McPherson strut that is a prior art strut.

FIG. 2 is a full side view of an illustration of a McPherson strut 30 that is a prior art strut. Shown in FIG. 2 is the smooth housing 31, the piston rod 32, the chassis attachment means 34 (a solid plate with attachment openings 33) for attachment of the strut 30 to the chassis or frame of an automobile, the top 35 of the piston rod 32 showing the terminal end threads 36 by which the upper end 35 of the piston guide 32 is attached to an automobile, along with a surfaced segment 37 for using a wrench.

Figure 3:
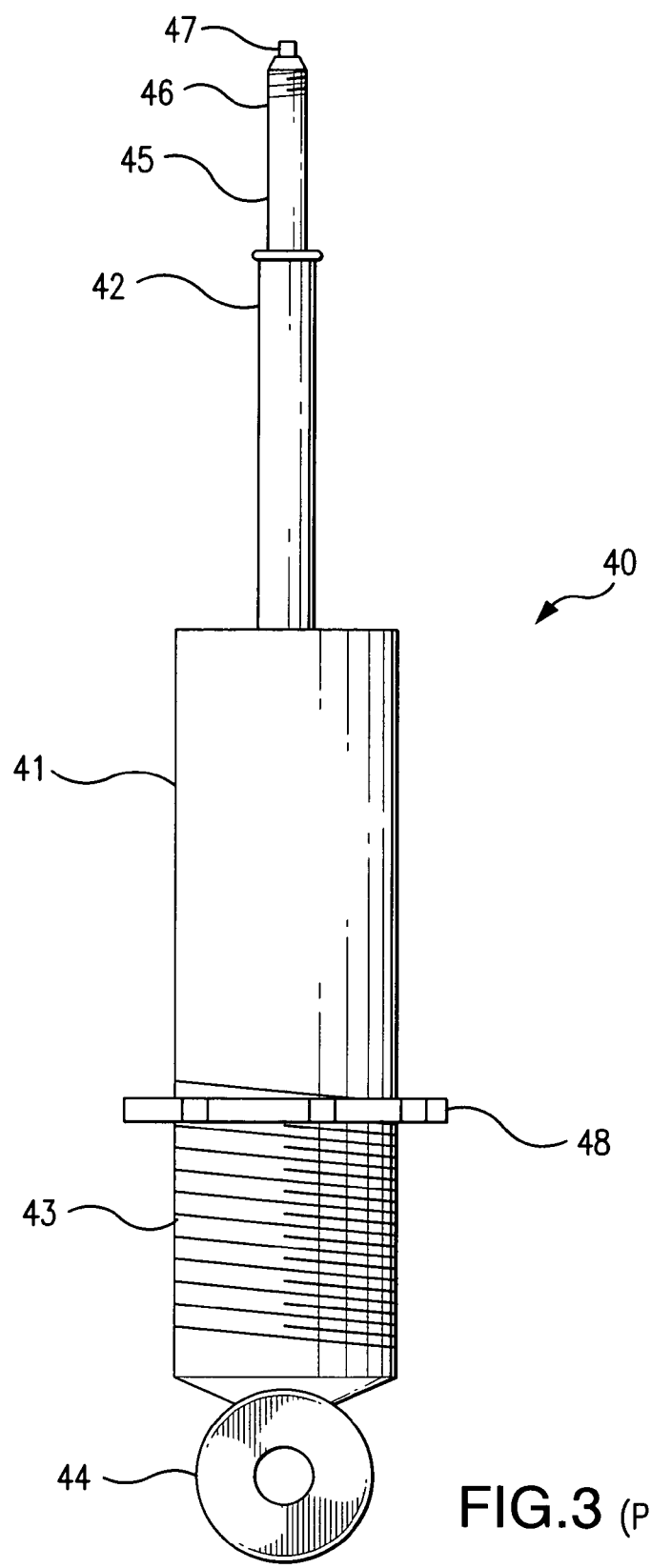
FIG. 3 is a full side view of an illustration of a smooth shock of the prior art having threads machined directly on the outside surface of the shock housing.

FIG. 3 is a full side view of an illustration of a smooth shock 40 of the prior art having threads 43 machined directly on the outside surface of the shock housing 41, the piston rod 42, the chassis attachment means 44 (a ring), for attachment of the shock 40 to the chassis or frame of an automobile, the top 45 of the piston rod 42 showing the terminal end threads 46 by which the upper end 45 of the piston rod 42 is attached to an automobile, along with a surfaced segment 47 for using a wrench. Also shown is the adjustment ring 48.

Figure 4:
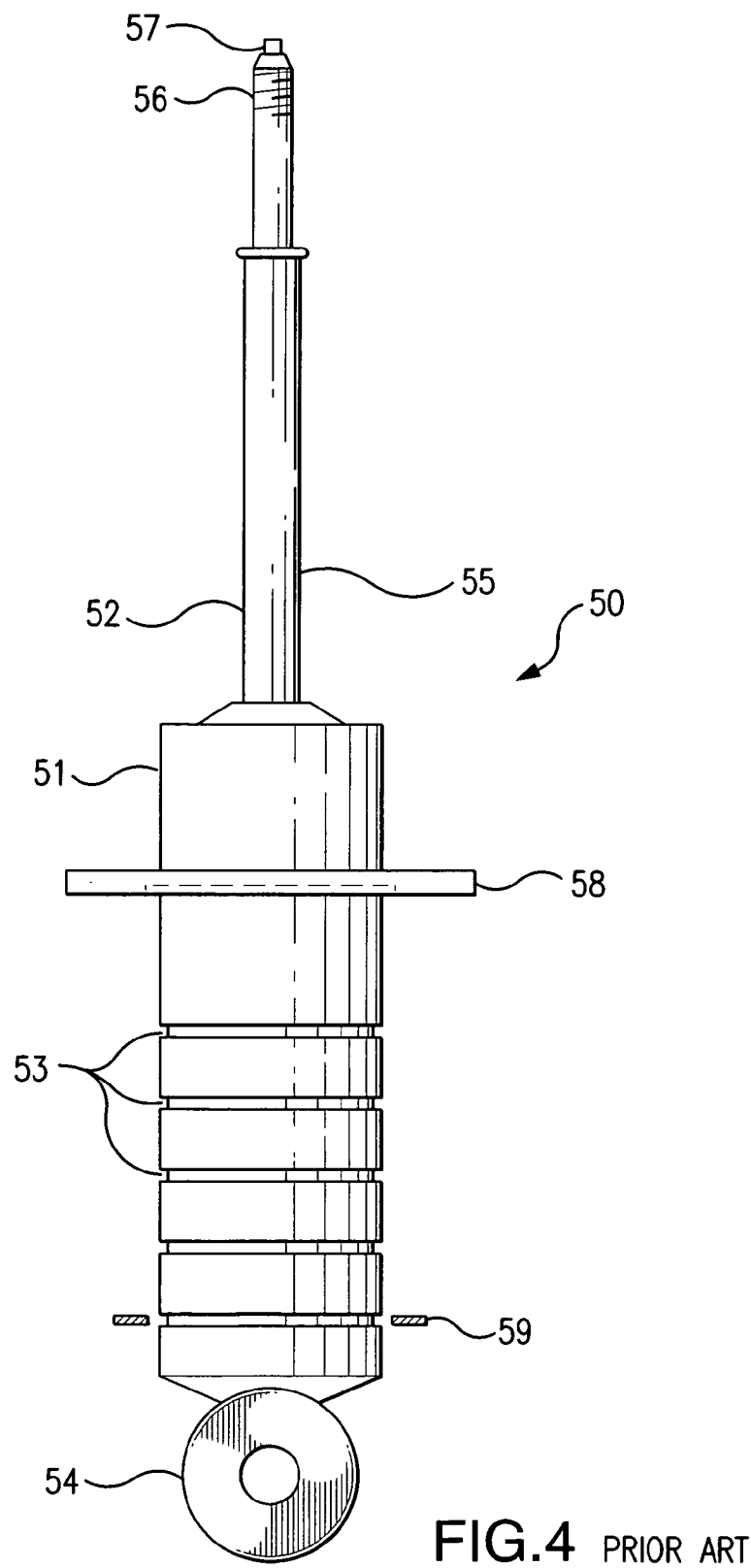
FIG. 4 is a full side view of an illustration of a smooth body shock of the prior art having square cut ring grooves machined into the outside surface of the shock housing.

FIG. 4 is a full side view of an illustration of a smooth body shock 50 of the prior art having square cut ring grooves 53 machined into the outside surface of the shock housing 51, the piston rod 52, the chassis attachment means 54 (a ring), for attachment of the shock 50 to the chassis or frame of an automobile, the top 55 of the piston rod 52 showing the terminal end 56 by which the upper end 55 of the piston rod 52 is attached to an automobile, along with a surface segment 57 for using a wrench. Also shown is an adjustment ring 58. In addition, there is shown a snap ring 59 that provides the adjustability. This device does not have infinite adjustment nor is it possible to do fine adjusting. In addition this device has questionable load capabilities depending on only one snap ring.

Figure 5:
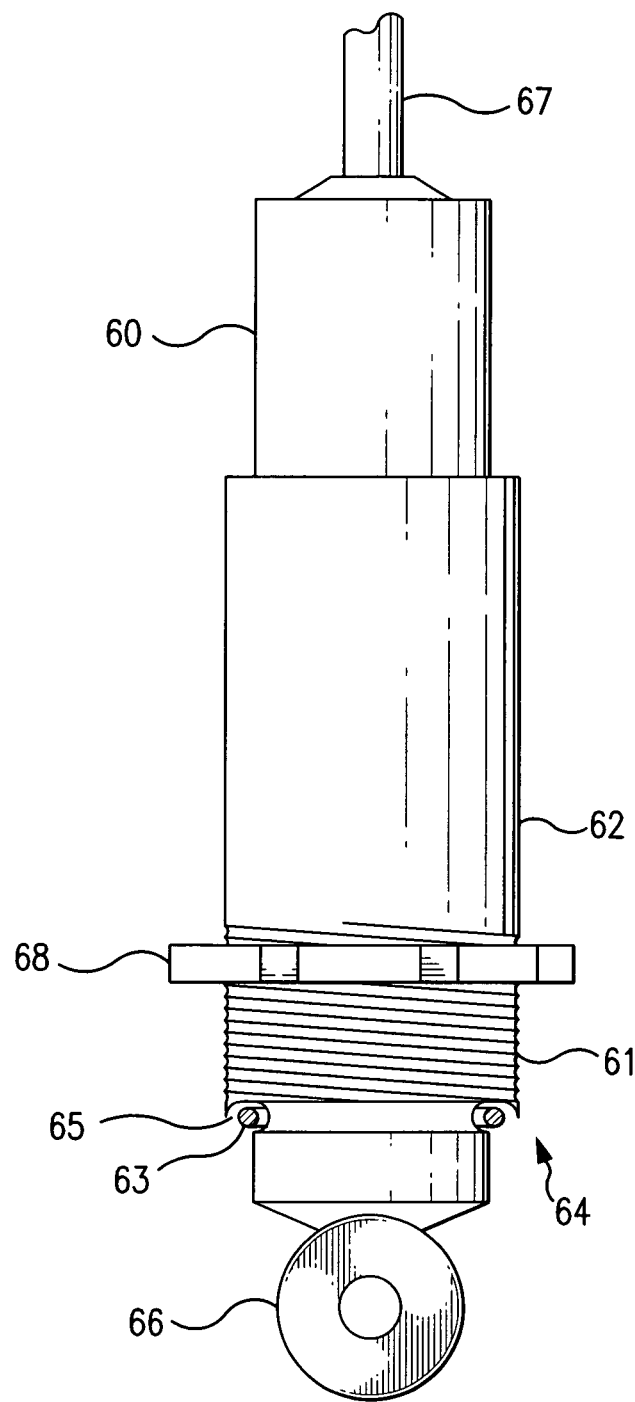
FIG. 5 is a full side of an illustration of a smooth body shock of the prior art having threads machined directly on the outside surface of the shock housing and a square cut ring grooves cut into the smooth body near the lower end of the shock.

FIG. 5 is a full side of an illustration of a smooth body shock 60 of the prior art having threads 61 machined directly on the outside surface of the shock housing 62 and a square or round cut ring groove 63 cut into the smooth body near the lower end 64 of the shock 60. The square cut or round ring groove 63 contains a snap ring 65. Also shown is the chassis attachment means 66 (a ring) for attachment of the shock 60 to the chassis or frame of an automobile, the piston rod 67, the adjustment ring 68. This device also suffers from questionable load capabilities owing to the single snap ring. In addition, the spring loading must be removed in order to adjust this prior art device.

Figure 6:
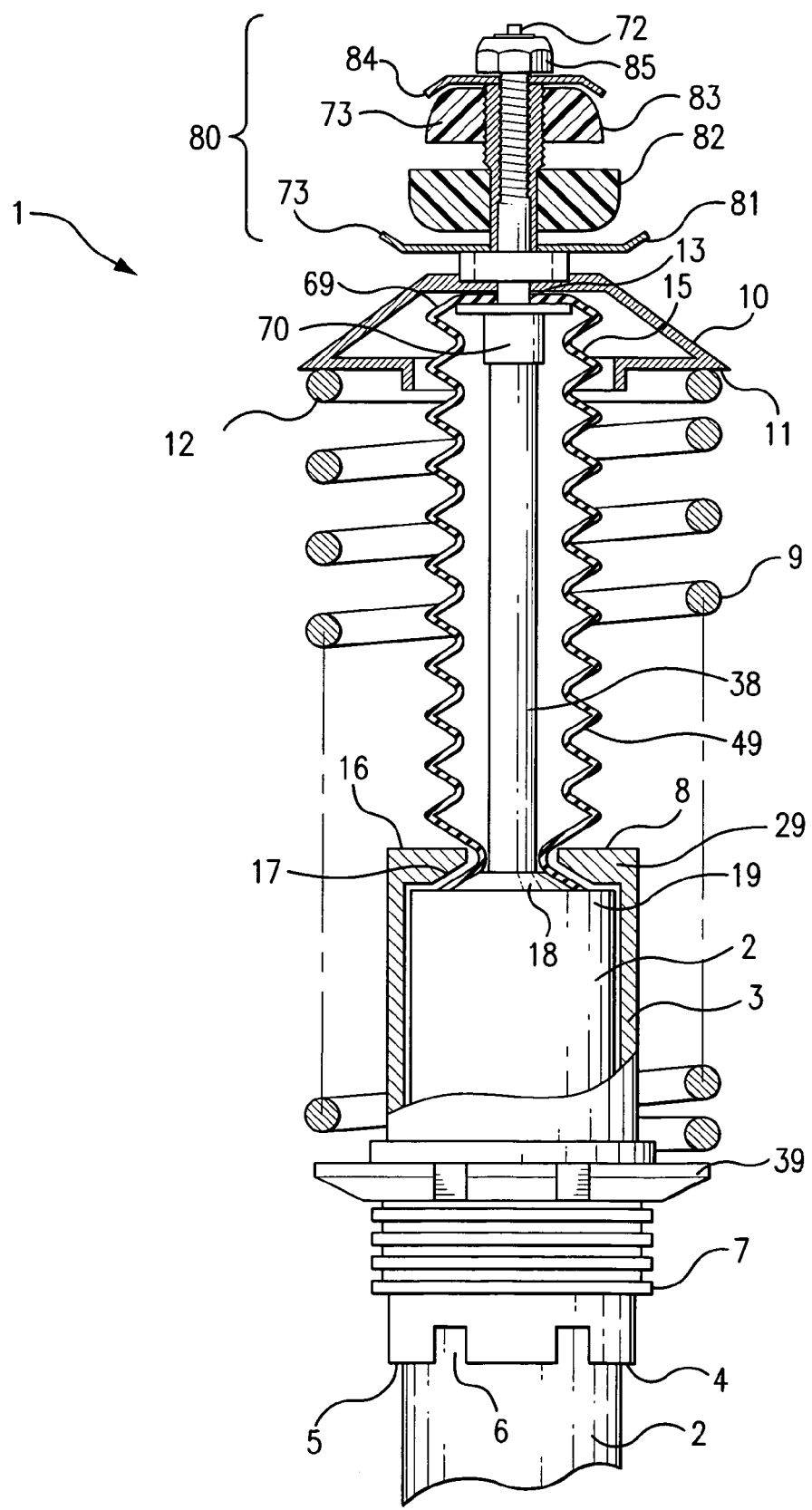
FIG. 6 is a full cross sectional view of the conversion assembly of this invention showing it mounted on a smooth body shock taken through A-A of FIG. 7.

Turning now to the invention and with reference to FIG. 6, there is shown a full cross section view of the conversion assembly 1 of this invention mounted on a smooth body shock 2.

The conversion assembly 1 is to be considered by itself in this explanation of the invention, the shock and its component parts being included for clearer illustration of the conversion assembly 1. The combination of the conversion assembly and the automotive shock absorbing assembly in combination will be considered in detail infra.

The conversion assembly 1 is comprised of a cylindrical housing 3 that is configured to and fits around the outside of the shock 2. The length of the cylindrical housing is dependent on the desires of the manufacturer and it is noted that the length should be a minimum of about 3 inches and a maximum of about 12 inches.

Figure 7A:
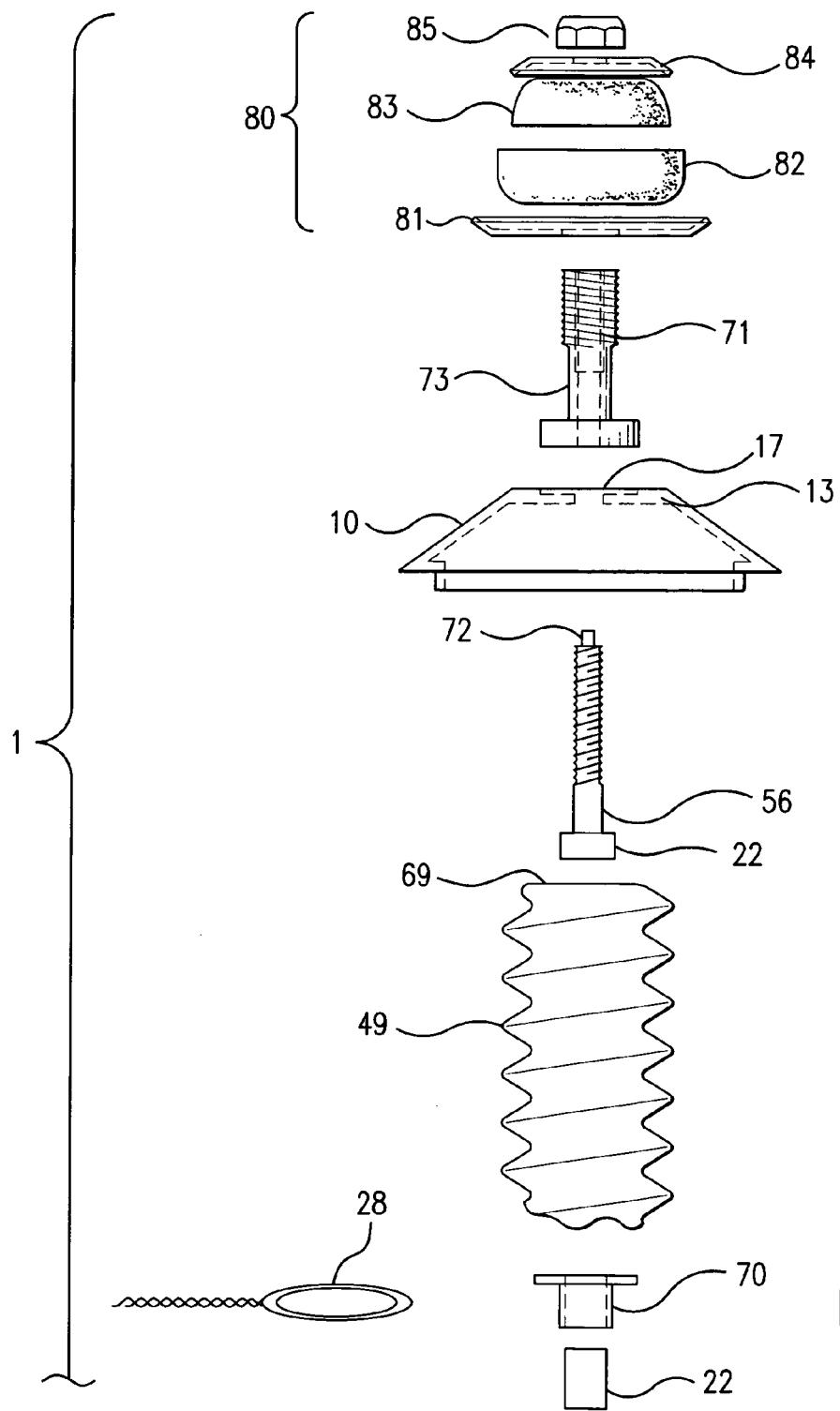
FIG. 7 is a full side exploded view of the combination of FIG. 1.
Figure 7B:
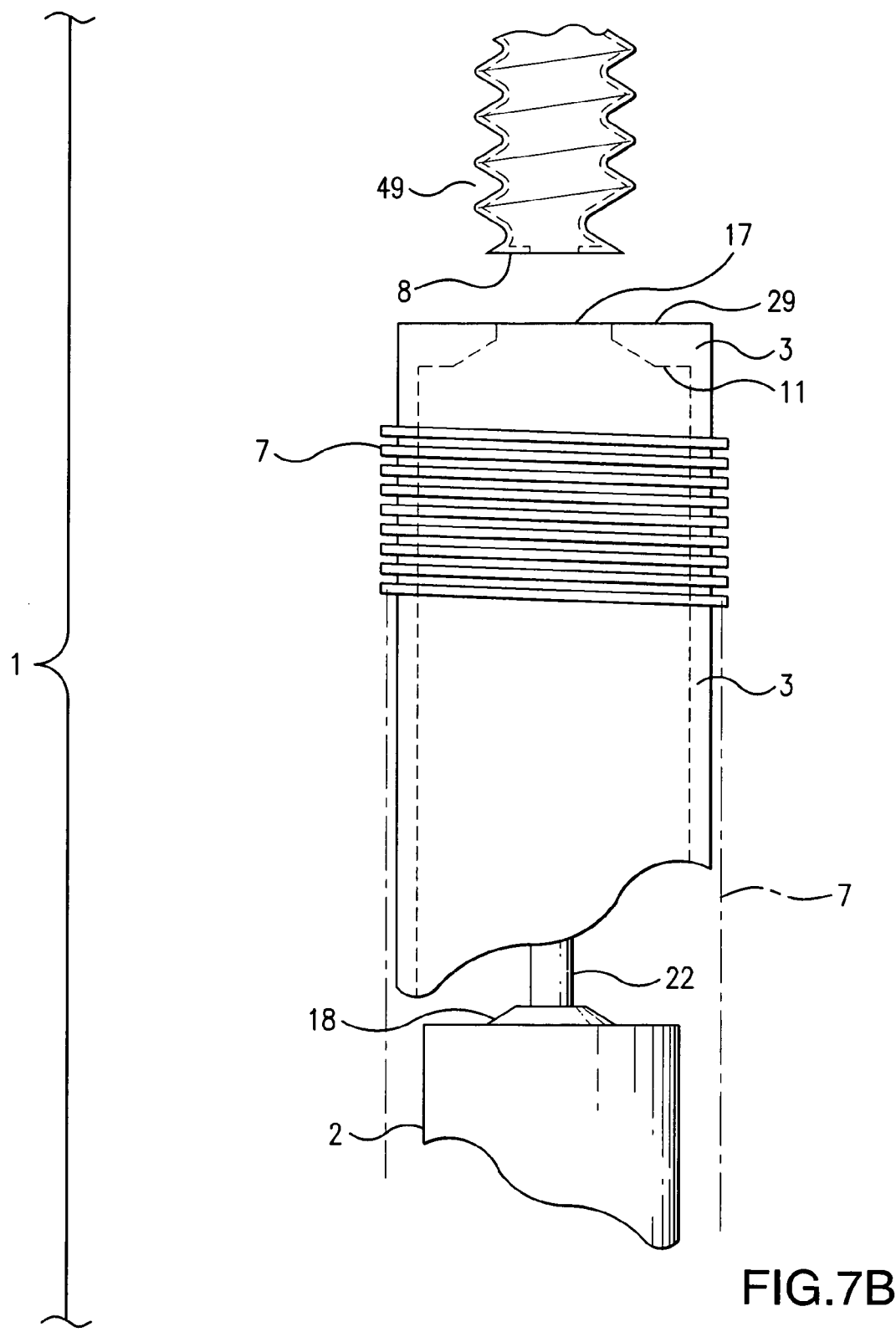
Figure 7C:
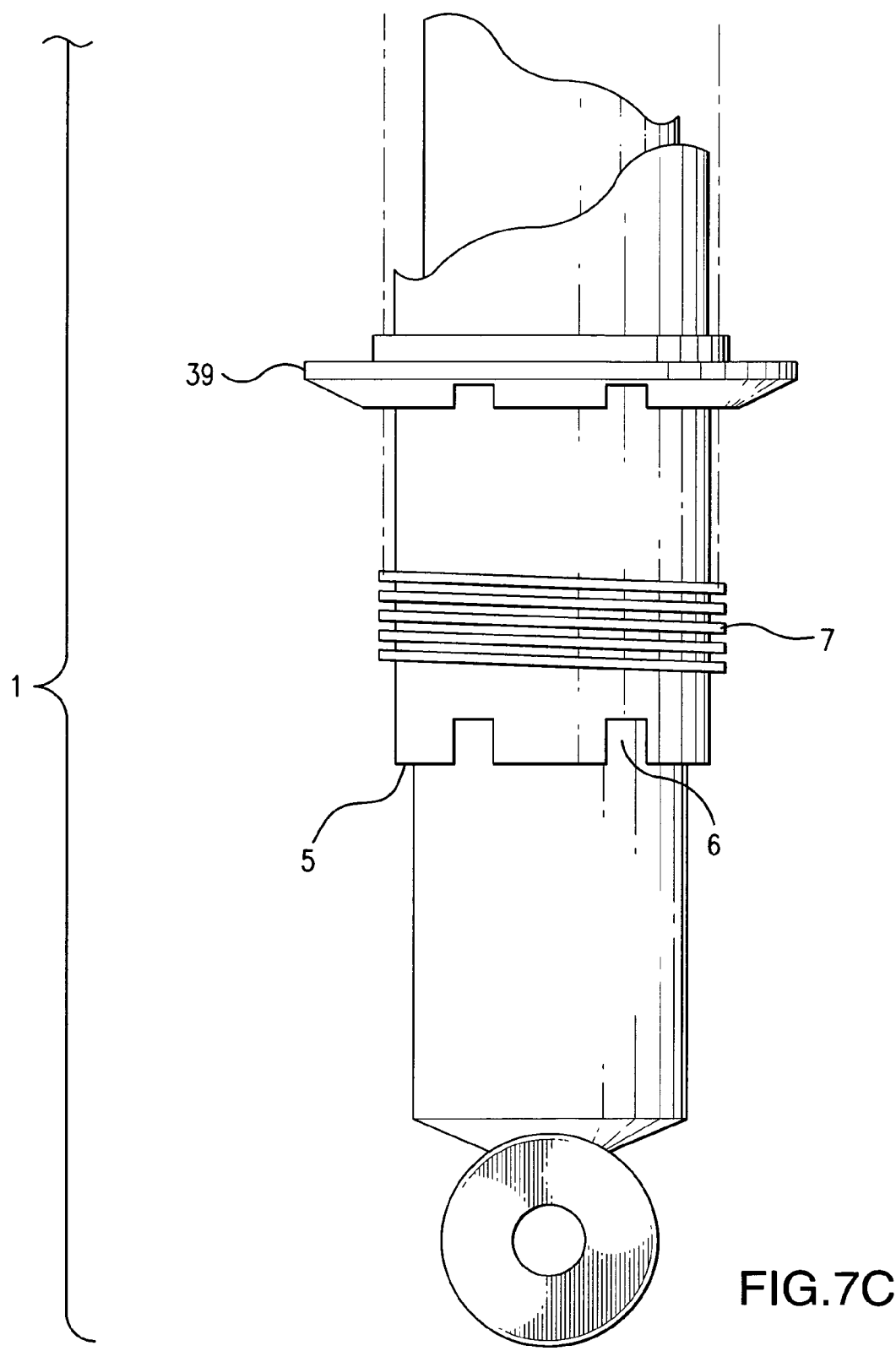

The cylindrical housing 3 has a distal end 4 that is open such that it will slide down over the shock 2. It is noted that the bottom edge 5 of the cylindrical housing 3 is crenellated (see FIGS. 6 and 7) such that a spanner tool can engage that end of the cylindrical housing 3 using the notches 6 in the crenellation.

The upper end 16 of the cylindrical housing 3 has an opening 17 through which the piston rod 38 projects. This opening has a seal 18 through which the piston rod 38 projects.

The under surface 19 of the top plate 29, adjacent the opening 17 is beveled such that the thickness of the top plate 29 at or near the opening 17 is thinner than the thickness of the top plate 29 near its outer edges. This so such that the lower end 8 of the piston rod bellows 49 can be fitted into the opening 17 and laid underneath the edges of the opening 17 in order to retain the piston rod bellows 49 inside the cylindrical housing 3. This upper end of the piston rod bellows 49 is also attached using a fastener 28 (see FIG. 7).

Near, and just above the crenellation notches 6, is a threaded portion 7 on the outside surface of the cylindrical housing 3. The number of threads in this profile can be a few, such as, 4 or 5, or the threads can extend the entire length of the cylindrical housing 3, depending on the desires of the manufacturer and the end use for the conversion assembly 1. Mounted on the threaded profile 7 is an adjustment ring 39 that can be moved up and down on the threads.

Surmounted on the outside of the cylindrical housing 3 and on the surface of the adjustment ring 39 is a coil spring 9. The coil spring 9 is surmounted by a coil spring retainer cap 10. The coil spring retainer cap 10 is configured on the bottom surface 11 such that there is a retainer and centering ring 12 that allows the coil spring retainer cap 10 to center, and hold the coil spring 9 essentially in alignment with the outside surface of the cylindrical housing 3. In addition, the coil spring retainer cap 10 has a larger opening 15 in the bottom to allow the entry of the piston rod bellows 49 to be inserted therein. The piston rod bellows 49 is essentially captured by inserting the upper end 69 of the bellows 49 into the larger opening 15 and allowing the upper end 69 of the bellows 49 to extend over the top of the hollow piston rod bellows retainer 70 and be clamped by the coil spring retainer cap 10 down over the end, thereby securing the end of the piston rod bellows 49 in the assembly 1.

The coil spring retainer cap 10 has a centered aperture 13 that allows a piston rod 22 (discussed infra) and a hollow piston rod bellows retainer 70 to be inserted therein. The hollow piston rod bellows retainer 73 is threaded down over the threaded top end 56 of the piston rod 22. In this manner, the upper end 69 of the piston rod bellows 49 is clamped into the assembly 1.

There is mounted on the piston rod 22 and surmounted on the coil spring retainer cap 10, a locking assembly 80 for locking the retainer cap 10 on the stem adapter 73 comprising a lower load support washer 81, surmounting the shock stem adapter 73 and coil spring retainer cap 10; a lower load support stem grommet 82 surmounting the washer 81; an upper load support stem grommet 83 surmounting the lower load support stem grommet 82; an upper load support retainer washer 84 surmounting the upper load support stem grommet 83 and, a locking nut 85 for retaining the assembly 80. The grommets 82 and 83 are manufactured from flexible urethane materials having a durometer in the range of from about 65 to about 100. The washers 81 and 84 are typically manufactured from metals such as aluminum or steel.

In a second embodiment, there is a conversion assembly that is modified such that it can be readily used with eye type top mount shocks. Such shocks are manufactured with an eyelet being welded on the top of the piston rod such that the components of the first embodiments would not fit over the eyelet in order to assemble the conversion assembly. Such a device 100 in combination with a shock 101 with a top eyelet 102 can be observed in FIG. 17. Also shown is the bottom eyelet 123.

Figure 8:
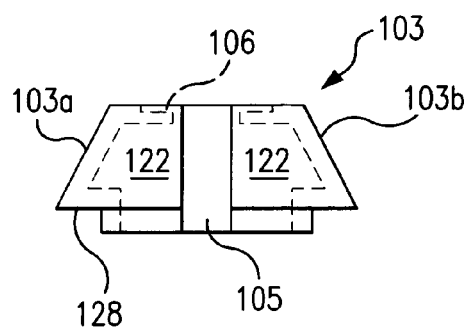
FIG. 8 is a full side view of a coil spring retain cap.

Turning now to the individual components of the device 100, and the shock 101, FIG. 8 is a full side view of a coil spring retainer cap 103 showing a left half 103a and a right half 103b. There is a centered pass through opening 105 in the coil spring retainer cap 103 to allow passage of a piston rod 108 (FIG. 17). There is a counter bore 106 that helps a cap adapter 107 (FIG. 9A) locate the coil spring retainer cap 103 in the correct position within the centered pass through opening 105. The dotted line designated 122 shows the open interior of the coil spring retainer cap 103.

Figure 10:
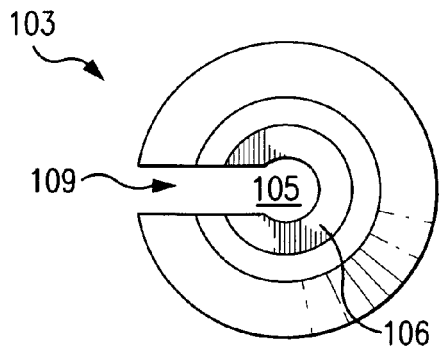
FIG. 10 is a full top view of a coil spring retainer cap of this invention.
Figure 14:
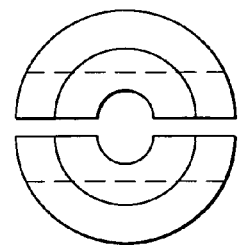
FIG. 14 is a full top view of an adapter stem of this invention.

The centered pass through opening 105 has enough clearance (slot 109, FIG. 10) such that there clearance for the piston rod 108 to allow assembly of the cap adapter 107 and the coil spring retainer cap 103 around the piston rod 108. FIG. 10 is a full top view of the coil spring retainer cap 103 in position along with the cap adapter 111 and showing the centered pass through opening 105.

Figure 11:
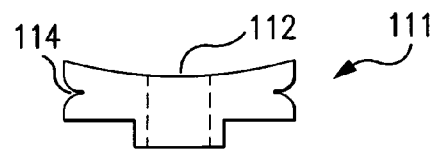
FIG. 11 is a full side view of a cap adjuster of this invention.
Figure 9A:
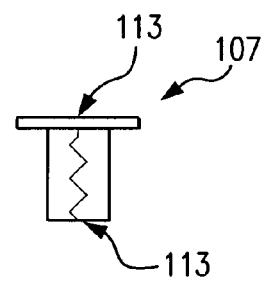
FIG. 9A is a full side view of a bellows retainer of this invention.
Figure 9B:
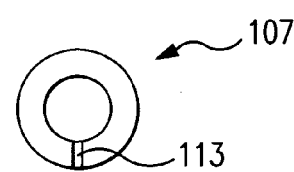
FIG. 9B is a full top view of the bellows retainer of FIG. 9A.
Figure 12:
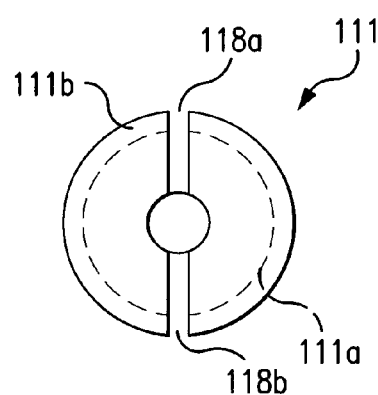
FIG. 12 is full top view of the cap adjuster of this invention.

The cap adapter 111 (FIG. 11) locks into the counter bore 106 in the coil spring retainer cap 103 which shows a second pass through opening 112 for the piston rod 108. FIG. 12 is a full top view of the bifurcated halves of the adapter stem 107 showing the left half 111a and the right half 111b provided by cut lines 118a and 118b. It should be noted that the cap adapter 111 has a groove 114 around its outside perimeter to accommodate a snap ring, not shown. FIG. 9A is a full side view of the adapter stem 107 and FIG. 9B is a full top view of the adapter stem 107 showing the cut 113.

Figure 13:
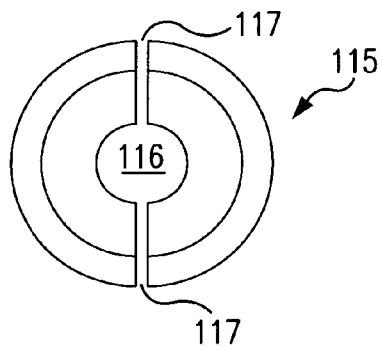
FIG. 13 is a full top view of the riser top of this invention.
Figure 15:
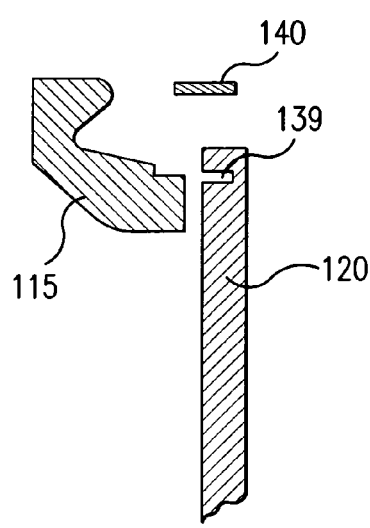
FIG. 15 is a portion of a riser top and housing wall showing a snap ring or key for attaching them to each other.
Figure 16:
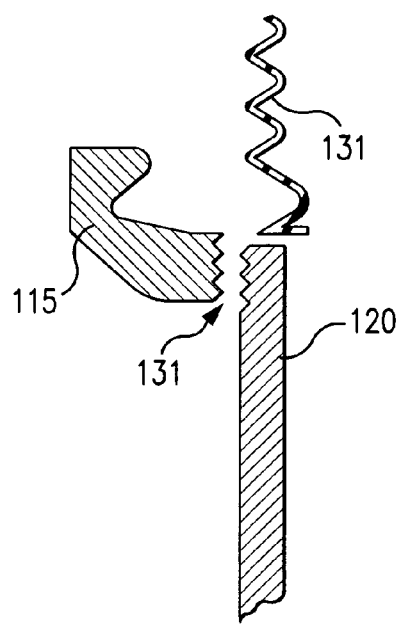
FIG. 16 is a portion of a riser top and housing wall showing threads for attaching them to each other.

There is a housing 120 for the conversion assembly 100 (FIG. 17), and FIG. 13 shows a full top view of a riser top 115 (the top) of the assembly 100. In this embodiment of the invention, the method of providing for the attachment of the riser top 115 to the top edge of the housing 120 is shown in FIGS. 15 and 16. Shown is a centered through opening 116 for the piston rod 108 (FIG. 13). A vertical cut line 117 (FIG. 13) provides for a bifurcation in the riser top 115.

There is a taper 121 on the underside of the riser top 115 that allows for guidance of the piston rod 108 of the shock when inserted through this opening.

Figure 17A:
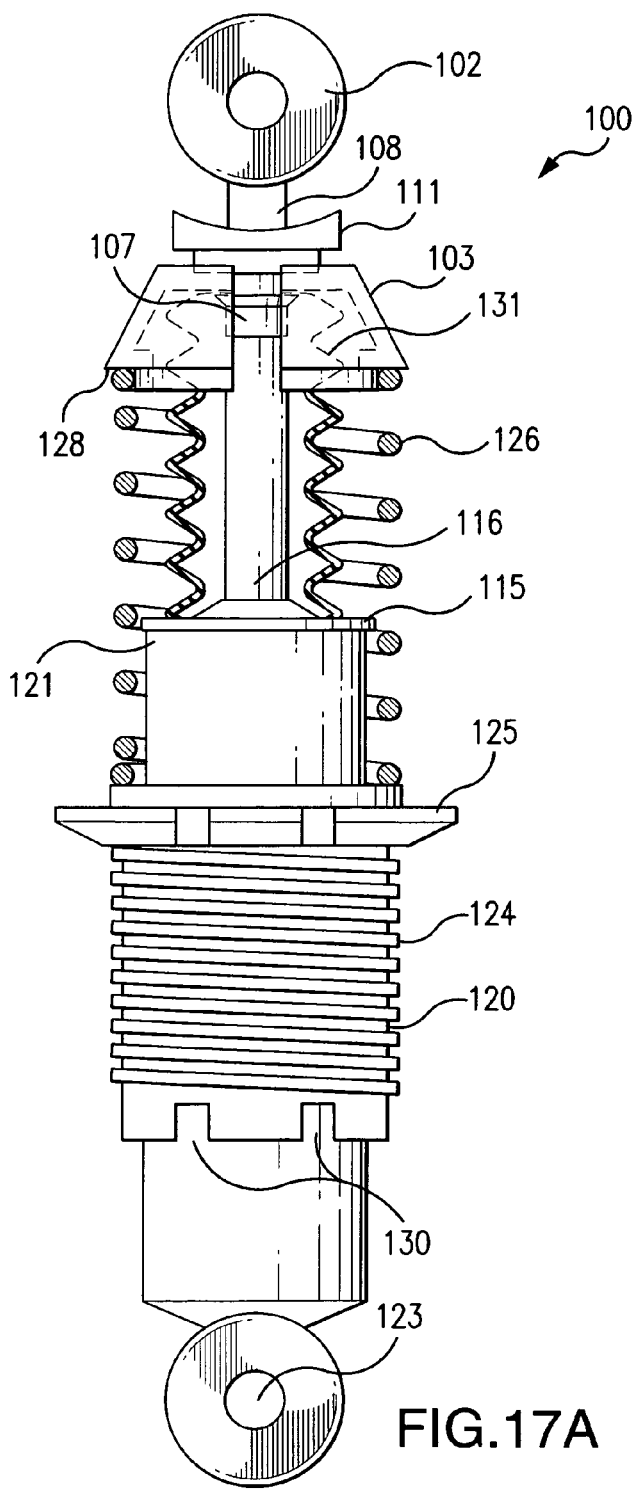
FIG. 17A is a full side view of the combination of the conversion assembly and shock.
Figure 17B:
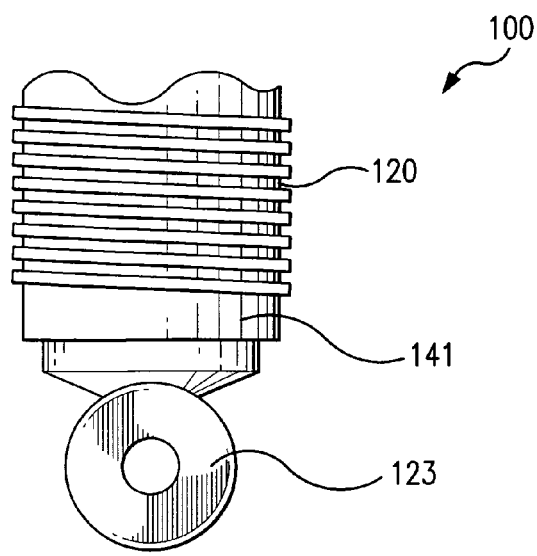
FIG. 17B is a portion of the bottom of the assembly of FIG. 17A showing the smooth external surface of the housing at the bottom.

FIG. 17 is a full side view of the combination of the conversion assembly 100 and the shock 101, the top eyelet 102 and the bottom eyelet 123, the eyelets being the means of attachment to a vehicle. FIG. 17B is a portion of the bottom of the assembly of FIG. 17A showing the smooth external surface 141 of the housing 120 at the bottom.

The conversion assembly 100 therefore consists of the housing 120, and for the embodiment shown in FIG. 17, a riser top 115 that is welded into place. Surrounding the housing 120 are threads 124 that are cut into the outer surface of the housing 120. Mounted on the threads 124 is a height adjusting ring 125 that is used to adjust the coil spring 126 which is surmounted on the top of the height adjusting ring 125 around the outside of the housing 120 and extends to the bottom 128 of the coil spring retainer cap 103. The bottom 128 of the coil spring retainer cap 103 has a circular protrusion 129 that helps keep the coil spring 109 in a centered position. There is a seal 127 in the opening 116.

Located in the hollow space 122 in the coil spring retainer cap 103 is the adapter stem 107, which abuts the underside of the cap adapter 111. Located in the bottom edge 129 of the housing 120 are crenulated notches 130 that are used for spanner tool engagement. These crenulated notches 130 are generally evenly spaced around the bottom edge 129, but it is not critical to practice the invention. These crenulated notches 130 allow the holding, or turning of the housing 120 without destroying the housing 120. It should be noted also that the threads 124 do not extend down to the bottom edge 129.

Figures 18, 19:
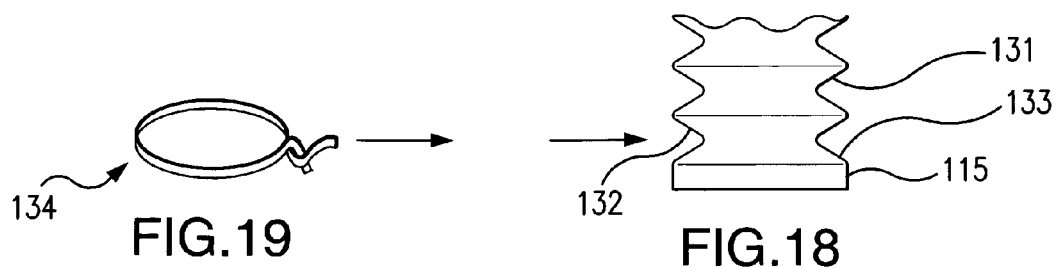
FIG. 18 is a portion of the bellows assembly.
FIG. 19 is a fastener useful in this invention.

Shown in FIG. 18 is a portion of the assembly emphasizing the bellows portion of the conversion assembly 100. The bellows 131 covers the piston rod 108 to protect it from water, salts, dirt, debris', and other materials so that it does not rust readily. The bellows 131 is placed such that the bottom 132 of the bellows 131 surrounds the notched portion 133 of the riser top 115 and then it is secured by a tie fastener 134 shown in FIG. 19.

Figure 20:
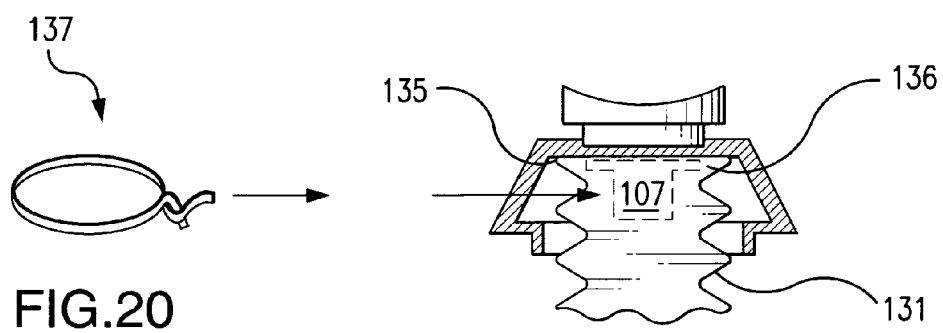
FIG. 20 is a fastener useful in this invention.

The top end of the bellows 131 (FIG. 17A) is secured by pulling the top 135 of the bellows 131 over the top 136 of the adapter stem 107 and then securing it with a second tie fastener 137 (FIG. 20). In addition, the compression of the spring 126 against the coil spring retainer cap 103, and further against the cap adapter 111 also constitutes an additional fastening means for the bellows 131.

When fully assembled, the conversion assembly 100 can be adjusted for pressure by compressing or releasing the coil spring 126 by adjusting the height adjusting ring 125. It should be noted that the trailing end 141 of the housing 120 does not have any threads 124 cut into it. This portion of the housing 120 is smaller in diameter than the threads 124, in order to enable one to move the adjusting ring 125 on and off of the threads 124 and the housing 120.

In another embodiment, there is a method of attaching the riser top 115 to the housing 120. In FIG. 16, there is an example of the riser top 115 being attached to the housing 120 by threads 138. Also shown in this Figure is a portion of the bellows 131.

In yet another embodiment of this invention, there is a third method of attaching the riser top 115 to the housing 120 by using a notch or groove 139 in the housing wall 120 into which there is inserted a key 140 (See FIG. 15).

What is claimed is:

1. In combination, a conversion assembly and an automotive shock absorbing assembly for automotive use, said automotive shock absorbing assembly being selected from the group consisting of:
   a. shocks and,
   b. struts,
   said automotive shock absorbing assembly distal end having a piston rod protruding therefrom and said automotive shock absorbing assembly distal end having mounted thereon, a means for attaching said automotive shock absorbing assembly to an automobile frame;
said conversion assemblies having an external housing having a distal end, and a near end,
said conversion assembly having an external spring adjuster tube, said external spring adjuster tube having a near end and a distal end, there being a first piston rod opening in the near end creating a near end housing plate, the near end housing plate having an inside surface, said inside surface being beveled, said piston rod near end having threads thereon;
said distal end of said conversion assembly being open to accommodate an automotive shock absorbing assembly;
the distal end of the external spring adjuster tube having on an outside surface, a threaded profile; there being mounted on said external spring adjuster tube, a coil spring height adjustment ring;
a coil spring retainer cap and contained within the external spring adjuster tube, a coil spring;
a piston rod protective bellows;
a shock stem adapter for retaining the coil spring retainer cap, said shock stem adapter being a hollow tube, said hollow tube having an internal threaded surface and an external surface to accommodate a wrench;
an assembly for locking the external spring adjuster tube on the piston rod comprising:
i. a lower load support washer surmounting the shock stem adapter and coil spring retainer cap;
ii. a lower load support stem grommet surmounting the washer;
iii. an upper load support stem grommet surmounting the lower load support stem grommet;
iv. an upper load support retainer washer surmounting said upper load support stem grommet, and,
v. a locking nut surmounting said upper load support retainer washer, said nut being threaded on said threaded surface of said piston rod, there being a fastening means for the piston rod bellows distal end on the piston rod bellows retainer, a top end of the piston rod bellows being retained by the shock stem adapter.

2. The conversion assembly and an automotive shock absorbing assembly as claimed in claim 1 wherein the distal end of the housing of the conversion assembly has a smooth outside surface.

3. The conversion assembly and an automotive shock absorbing assembly as claimed in claim 1 wherein the distal end of the housing of the conversion assembly has a crenellated bottom edge.

4. A conversion assembly having an external housing having a distal end, and a near end;
said conversion assembly having an external spring adjuster tube, said external spring adjuster tube having a near end and a distal end, there being a first piston rod opening in the near end creating a near end housing plate, the near end housing plate having an inside surface, said inside surface being beveled;
said distal end of said conversion assembly being open to accommodate an automotive shock absorbing assembly;
the distal end of the external spring adjuster tube having on an outside surface, a threaded profile; there being mounted on said external spring adjuster tube, a coil spring height adjustment ring;
a coil spring retainer cap and contained within the external spring adjuster tube, a coil spring;
a shock stem adapter for retaining the coil spring retainer cap, said shock stem adapter being a hollow tube, said hollow tube having an internal threaded surface and an external surface to accommodate a wrench;
an assembly for locking the external spring adjuster tube on a piston rod comprising:
i. a lower load support washer surmounting the shock stem adapter and coil spring retainer cap;
ii. a lower load support stem grommet surmounting the washer;
iii. an upper load support stem grommet surmounting the lower load support stem grommet;
iv. an upper load support retainer washer surmounting said upper load support stem grommet, and,
v. a locking nut surmounting said upper load support retainer washer, said nut being threaded on said threaded surface of said piston rod, there being a fastening means for the piston rod bellows distal end on the piston rod bellows retainer.

5. The conversion assembly as claimed in claim 4 wherein the distal end of the housing of the conversion assembly has a smooth outside surface.

6. The conversion assembly as claimed in claim 4 wherein the distal end of the conversion assembly housing is crenellated to accommodate a spanner wrench.

7. In combination, a conversion assembly and an automotive shock absorbing assembly for automotive use, said automotive shock absorbing assembly being selected from the group consisting of:
a. shocks and,
b. struts,
said automotive shock absorbing assembly having a distal end and a near end;
said automotive shock absorbing assembly distal end having a piston rod protruding therefrom and said automotive shock absorbing assembly distal end and near ends having mounted thereon, eyelets for attaching said automotive shock absorbing assembly to an automobile frame;
said conversion assembly having an external housing having a distal end, and a near end;
said conversion assembly having an external spring adjuster tube, said external spring adjuster tube having a near end and a distal end, there being a first piston rod opening in the near end creating a near end housing plate, the near end housing plate having an inside surface, said inside surface being beveled, said piston rod near end having threads thereon;
said distal end of said conversion assembly being open to accommodate an automotive shock absorbing assembly;
the distal end of the external spring adjuster tube having on an outside surface that is a threaded profile; there being mounted on said external spring adjuster tube, a coil spring height adjustment ring;
a coil spring retainer cap and contained within the external spring adjuster tube, a coil spring;
a piston rod protective bellows;
a shock stem adapter for retaining the coil spring retainer cap, said shock stem adapter being a hollow tube, said hollow tube having an internal threaded surface and an external surface to accommodate a wrench;
an assembly for locking the external spring adjuster tube on the piston rod comprising:
vi. a lower load support washer surmounting the shock stem adapter and coil spring retainer cap;
vii. a lower load support stem grommet surmounting the washer;
viii. an upper load support stem grommet surmounting the lower load support stem grommet;

ix. an upper load support retainer washer surmounting said upper load support stem grommet, and, x. a locking nut surmounting said upper load support retainer washer, said nut being threaded on said threaded surface of said piston rod, there being a fastening means for the piston rod bellows distal end on the piston rod bellows retainer, a top end of the piston rod bellows being retained by the shock stem adapter.

8. The conversion assembly and an automotive shock absorbing assembly as claimed in claim 7 wherein the distal end of the housing of the conversion assembly has a smooth outside surface.

9. The conversion assembly and an automotive shock absorbing assembly as claimed in claim 7 wherein the distal end of the housing of the conversion assembly has a crenellated bottom edge.

10. A conversation assembly as claimed in claim 4 wherein the near end housing plate is attached to the housing with threads.

11. A conversation assembly as claimed in claim 4 wherein the near end housing plate is attached to the housing with a groove and snap ring.

\* \* \* \* \*